United States Patent Office 3,574,136
Patented Apr. 6, 1971

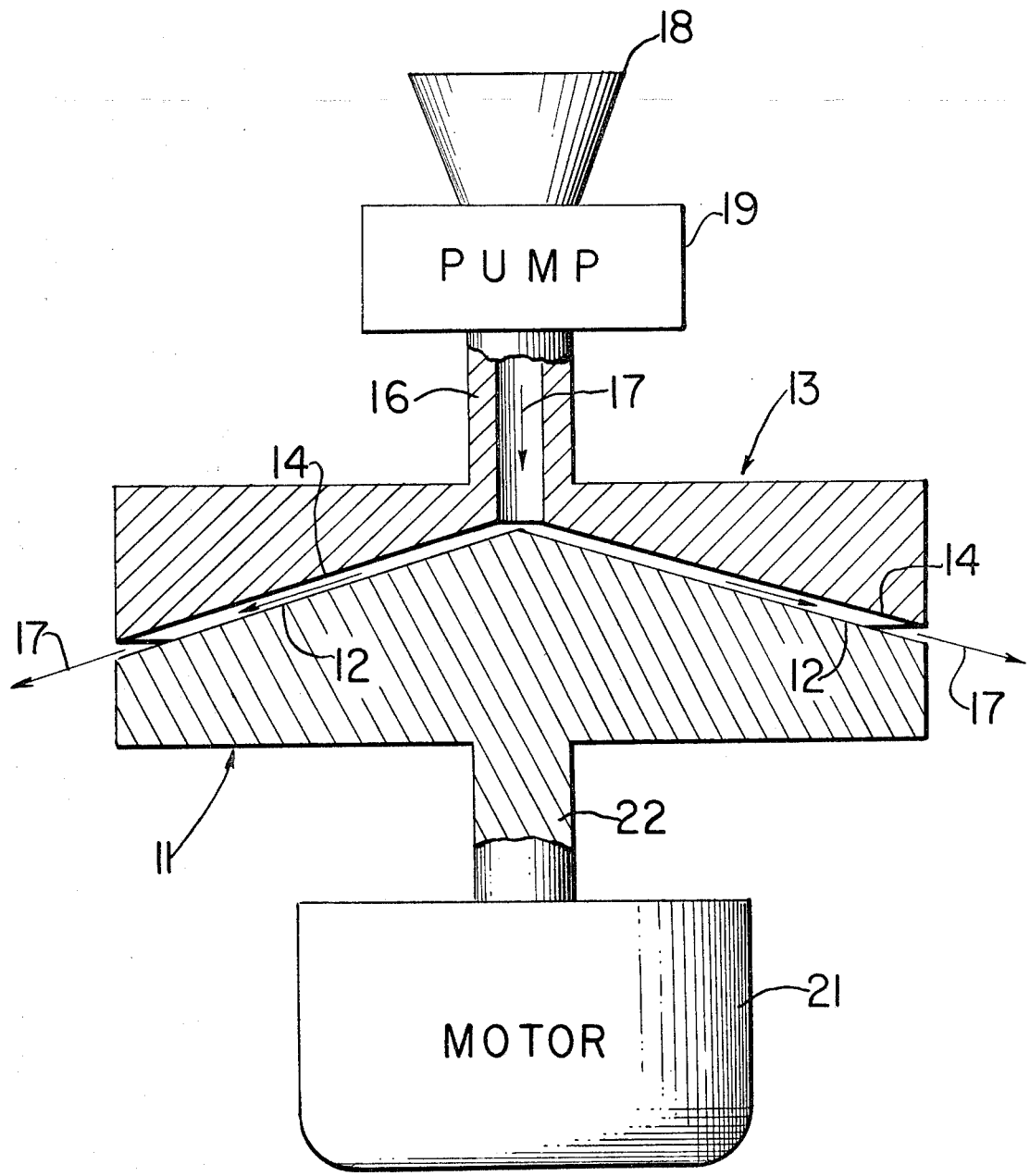

3,574,136
DEWATERING BITUMINOUS FROTH
Francis J. Werth, Edmonton, Alberta, Canada, assignor to Cities Service Athabasca, Inc., Imperial Oil Limited, Atlantic Richfield Corporation, and Royalite Oil Company, Limited, fractional part interest to each
Filed June 17, 1968, Ser. No. 737,550
Int. Cl. B01d *17/00*
U.S. Cl. 252—349    10 Claims

ABSTRACT OF THE DISCLOSURE

Bituminous emulsion such as that produced in the hot water process for recovery of bitumen from tar sand is treated for coalescence of water contained in the emulsion by forcing the emulsion between two closely and uniformly spaced surfaces. Shearing forces are thus applied to the emulsion and result in coalescence of water which may subsequently be removed to enable recovery of bitumen of reduced water content. The surfaces between which the emulsion is forced may be parallel or curved concentric surfaces and are preferably spaced between about ⅛ and about ½ inch apart. Additional shearing force may be applied by movement of at least one of the surfaces in a direction transverse to the direction of flow of the emulsion between the surfaces.

---

Large deposits of bituminous sand are found in various localities throughout the world. The term "bituminous sand" is used herein to include those materials commonly referred to as oil sand, tar sand and the like. One of the most extensive deposits of bituminous sand occurs, for instance, in the Athabasca District of the Province of Alberta, Canada.

Typically, these sands contain from about 6% to about 20% of bitumen (also referred to herein as oil), from about 1% to about 10% of water, and from about 70% to about 90% of mineral solids. The specific gravity of the bitumen varies from about 1.0 to about 1.05 and the bitumen has an API gravity of about 8.0 degrees. This value for specific gravity as well as that of the specific gravity of any other material given herein is taken at 60° F. All percentage values are on a weight basis unless otherwise specified.

The major portion, by weight, of the mineral solids in bituminous sand is quartz sand having a particle size greater than about 45 microns and less than 2,000 microns. The term "mineral" is used herein to describe material of inorganic origin such as sand, clay and the like as distinguished from material of organic origin such as coke. For the most part, the remaining mineral solid material has a particle size of less than about 45 microns. This smaller-size mineral solid material is referred to as "fines." The fines contain clay and silt including some very small particles of sand. The fines content typically varies from about 10% to about 30% by weight of the total solid mineral content of bituminous sand. However, it is not uncommon for the ingredients of bituminous sand to vary from the above-mentioned concentrations.

Various methods are known for separating bitumen from bituminous sand. Some of these methods involve the use of water for preparing a slurry at a temperature above about 75° F. Most of the coarse sand and portions of the fines are separated from the slurry by various means, such as settling, to recover an emulsion, or froth, which contains some of the fines, and quantities of coarse sand. Such an emulsion or froth is referred to herein as a bituminous emulsion.

Although the bituminous emulsion employed as the feedstock of this invention is not dependent on any particular technique in the water extraction of bituminous sand, one well-known method for preparing such emulsions is often referred to as the "hot-water process." In the hot-water process, the bituminous sand is slurried with steam and hot water at about 180° F. and the pulp is then agitated with a stream of circulating hot water and carried to a separation cell in which a body of hot water is maintained at an elevated temperature of about 180 F. In the separation cell, entrained air causes the bitumen to rise to the top of the cell in the form of an emulsion containing air, bitumen, water and mineral solids. The mineral solids are extremely difficult to separate from the bitumen and, unless the emulsion is further treated, it will generally contain at least 5% of mineral solids. This bituminous emulsion or froth can be subjected to water washing to effect a partial reduction in solids.

A bituminous emulsion, such as that obtained by the above-described procedures, often contains from about 10% to about 60% water, 5% to about 20% of mineral solids and from about 30% to about 85% bitumen. Usually, however, the bituminous emulsion or froth will contain, by weight, from about 25% to about 50% water, or about 5% to about 12% mineral solids and about 35% to about 70% of bitumen.

Separation of water and mineral solids from the bituminous emulsion is necessary for most ultimate uses of the bitumen. However, the separation of water and mineral solids from the emulsion is difficult.

A number of methods have been proposed for breaking bituminous emulsions and recovering the bitumen. However, these generally suffer from various shortcomings such as incomplete separation or high cost. One such method involves gravity settling of solids and water after dilution with light hydrocarbon solvent.

In accordance with the present invention, water present in aqueous bituminous emulsions such as those formed as described above may be coalesced by forcing the emulsion between two closely and uniformly spaced surfaces to impart shearing energy to the emulsion and thereby coalesce the water contained in the emulsion. Bitumen of reduced water content can then be recovered by separating coalesced water from bitumen and uncoalesced water in any suitable manner, such as by conventional settling.

The accompanying drawing illustrates a suitable arrangement of apparatus for carrying out a preferred embodiment of the invention.

The uniformly and closely spaced surfaces between which bitumen is forced in accordance with the invention may take any suitable form but parallel or curved concentric surfaces are preferred. Flat parallel plates are for instance suitable as are concentric pipes arranged to form an annular space through which the emulsion may be forced. Best results are obtained when the surfaces are maintained between about ⅛ and about ½ inch apart throughout the areas through which the bitumen is forced. In order to impart the desired amounts of shearing energy as described below, it is generally preferred that the surfaces maintain their close and uniform spacing through a distance of at least about 12 inches in the direction of flow of the emulsion between the surfaces.

In forcing emulsion between surfaces in accordance with the invention, sufficient shearing energy should be imparted to the emulsion to coalesce the desired amount of water from the emulsion. It has been found that maximum benefit may be obtained if shearing energy is imparted to the emulsion in amounts between about 500 and about 4,000 foot pounds (ft.-lbs.) of energy per pound of bitumen in the emulsion. The use of additional amounts of shearing energy usually produces very little additional benefit for the additional expense while the use of less than about 500 ft.-lbs. of shearing energy per pound of bitumen usually does not coalesce enough water to reduce the water content of the emulsion sufficiently below that which could be obtained by more conventional means such as settling. Pressure differentials of between about 50 and about 400 p.s.i. have been found suitable for forcing bitumen between surfaces as provided herein, especially when the preferred spacing described above is maintained between the surfaces.

In practicing the present invention, it has also been found that the temperature at which the emulsion is forced between the surface has a significant effect upon the process. Temperatures less than about 90° F. or more than about 150° F. are relatively ineffective and temperatures in the range of between about 95 and about 120° F. are preferred in order to obtain maximum coalesce of water at minimum cost. At temperatures below about 95° F. the emulsion becomes difficult to handle because of increased viscosity of bitumen and at temperatures above about 120° F. the viscosity of bitumen is so low that it becomes difficult to apply the necessary amount of shearing force to the emulsion.

While coalescing water from emulsion in accordance with the invention, a portion of the shearing force needed to coalesce the desired amount of water may be applied to the emulsion by moving at least one of the surfaces between which the emulsion is passing in a direction transverse to the direction of flow of the emulsion between the surfaces while maintaining the desired spacing between the surfaces. Such relative movement of the surfaces may substantially reduce the distance ordinarily needed for passage of emulsion between the surfaces as well as the pressure required for forcing emulsion between the surfaces. Relative velocities between the surfaces of between about 5 and about 100 ft. per minute are preferred for this purpose and movement of the surfaces may conveniently be used to impart up to about 50% or more of the desired shearing energy to the emulsion.

Recovery of bitumen from the coalesced water of the bituminous emulsion may be accomplished in a number of suitable ways. For instance, the emulsion containing coalesced water may merely be allowed to settle so that the water forms a lower layer which may then be removed. this, however, is a rather slow, inefficient method of separation and faster techniques are preferred. One preferred method for recovering bitumen from the bituminous emulsion is by contact with a moving inclined surface which causes the bitumen to be removed from the less viscous coalesced water because of preferential adherence of the bitumen to the moving surface. Once this separation has been accomplished, the bitumen may be removed from the surface and collected while the water may be collected separately and discarded or used for any other desired purpose. A cylinder or inclined surface, as shown for instance in Canadian Pat. 778,347 to McLatchie et al., or counter rotating cylinders, as shown for instance in U.S. Pat. 2,174,849 to Stevens, are examples of suitable means for recovery of bitumen from coalesced water. Separation of bitumen from coalesced water in this manner may be accomplished at any suitable temperature such as between about 50 and about 140° F.

Referring to the drawing, one suitable form of apparatus for carrying out the process of the present invention includes a lower member 11 having a generally conical upper surface 12 and an upper member 13 having a generally conical lower surface 14. The upper member 13 and lower member 11 are positioned so that the surfaces 12 and 14 are closely and uniformly spaced from each other to form a suitable space through which aqueous bituminous emulsion may be forced to coalesce water contained therein.

Bituminous emulsion containing uncoalesced water may be introduced to the space formed by the surfaces 12 and 14 by suitable means such as through an upwardly extending hollow shaft 16 forming a part of the upper member 13. Emulsion introduced under pressure through the shaft 16 passes through the shaft 16 and is forced outwardly through the space between the surfaces 12 and 14 as indicated by arrows 17. Shearing forces applied to the emulsion by the surfaces 12 and 14 as the emulsion is forced between these surfaces serve to coalesce water in the emulsion. Emulsion may be introduced into the shaft 16 under pressure by any suitable means such as through a hopper 18 and pump 19.

While satisfactory results can be obtained by merely forcing emulsion between stationary surfaces 12 and 14, additional shearing force can be applied to the emulsion by rotating the surfaces 12 and 14 with respect to one another. This may be accomplished by rotating one of the two surfaces while maintaining the other stationary or by rotating both surfaces in opposite directions. In the form of apparatus shown in the drawing, a motor 21 is used to rotate the lower member 11 including the surface 12 thereof as by means of a shaft 22 which may form a part of the lower member 11. Rotational speeds are preferably sufficient to achieve peripheral speeds between about 5 and about 100 ft. per minute for relative rotation of the surfaces 12 and 14.

The following example will illustrate the use of apparatus such as shown in the drawing in practicing the process of the present invention.

EXAMPLE

In this example, apparatus such as shown in the drawing is used to coalesce water in an aqueous bituminous emulsion containing 23 wt. percent water, 68 wt. percent bitumen and 9 wt. percent solids. The upper and lower members 11 and 13 are 12 inches in diameter and the surfaces 12 and 14 extend in close, uniform spaced relationship to form an annular space having a radial distance of 6 inches from the point of introduction of emulsion between the surfaces at the center of the apparatus to the periphery of the surfaces. The upper and lower surfaces 12 and 14 are in this example spaced apart ¼ inch. Emulsion is fed through the hopper 18 and forced by the pump 19 through the central shaft 16 and outwardly between the surfaces 12 and 14 under a pressure of 50 p.s.i.g. and the motor 21 is used to rotate the surface 12 wtih respect to the surface 14 at the rate of 20 r.p.m. to give a peripheral speed of 28 ft. per minute. The total shearing energy imparted to the emulsion while it is being forced between the surfaces 12 and 14 amounts to 900 ft.-lbs. per pound of bitumen present in the emulsion of which about 30% is imparted by rotation of the surface 12. This treatment produces an emulsion containing 14 wt. percent uncoalesced water, 9 wt. percent solids and 77 wt. percent bitumen. If desired, the coalesced water may readily be removed as described above.

While the invention has been described above with respect to certain preferred embodiments thereof, it will be understood by those skilled in the art that various changes and modifications may be made without departing from the spirit and scope of the invention and it is intended to cover all such changes and modifications in the appended claims.

I claim:
1. The process for coalescing water in an aqueous bituminous emulsion which comprises forcing said emulsion between two closely and uniformly spaced surfaces at a temperature between about 90° and about 150° F. to impart shearing energy to the emulsion in amounts between about 500 and about 4000 ft.-lbs. of energy per pound of bitumen in the emulsion and thereby coalesce water in such emulsion.

2. The process of claim 1 in which the surfaces are uniformly spaced between about ⅛ an about ½ inch apart.

3. The process of claim 2 in which the surfaces are parallel surfaces.

4. The process of claim 2 in which the surfaces are concentric curved surfaces.

5. The process of claim 2 in which at least a portion of the shearing energy is imparted to the emulsion by relative movement of at least one of the surfaces transverse to the direction of flow of the emulsion between the surfaces while maintaining the surfaces uniformly spaced.

6. The process of claim 2 in which the closely spaced uniform surfaces extend at least about 12 inches in the direction of flow of the emulsion.

7. The process of claim 6 in which the pressure used to force the emulsion between the surfaces is between about 50 and about 400 p.s.i. and the temperature of such emulsion is maintained between about 90 and about 150° F.

8. The process of claim 7 in which at least a portion of the shearing energy is imparted to the emulsion by relative movement of at least one of the surfaces transverse to the direction of flow of the emulsion between the surfaces while maintaining the surfaces uniformly spaced.

9. The process of claim 8 in which the surfaces are parallel surfaces.

10. The process of claim 8 in which the surfaces are concentric curved surfaces.

References Cited

UNITED STATES PATENTS 1,362,105   12/1920   Joseph _____ 252—349

JOHN D. WELSH, Primary Examiner

U.S. Cl. X.R.

252—311.5, 360